United States Patent [19]
Mukawa

[11] Patent Number: 5,329,504
[45] Date of Patent: Jul. 12, 1994

[54] DISC CARTRIDGE LOADING APPARATUS

[75] Inventor: Hiroshi Mukawa, Kanagawa, Japan

[73] Assignee: Sony Corporation, Japan

[21] Appl. No.: 12,883

[22] Filed: Feb. 3, 1993

[30] Foreign Application Priority Data

Feb. 10, 1992 [JP] Japan .................................. 4-056563

[51] Int. Cl.⁵ ...................... G11B 13/04; G11B 17/02; G11B 21/12
[52] U.S. Cl. ...................... 369/13; 369/75.2; 369/77.2
[58] Field of Search .................. 369/13, 75.2, 78, 77.2; 360/114, 105, 99.6, 96.6

[56] References Cited

U.S. PATENT DOCUMENTS

| | | | |
|---|---|---|---|
| 4,984,225 | 1/1991 | Ando | 360/114 |
| 4,999,725 | 3/1991 | Takahashi | 360/105 |
| 5,034,933 | 7/1991 | Fujisawa et al. | 369/13 |
| 5,103,435 | 4/1992 | Nemoto et al. | 360/114 |
| 5,122,998 | 6/1992 | Mizuno et al. | 360/114 |
| 5,195,079 | 3/1993 | Inoue eal. | 360/99.06 |

FOREIGN PATENT DOCUMENTS 0439286 7/1991 European Pat. Off. .
60-251541 5/1986 Japan .

Primary Examiner—Stuart S. Levy
Assistant Examiner—Brian E. Miller
Attorney, Agent, or Firm—Charles P. Sammut

[57] ABSTRACT

A disc recording apparatus includes a base member, a cartridge holder, a magnetic head and a supporting arm. The base member has a spindle motor to rotationally drive a magneto-optical disc accommodated in a disc cartridge and an optical pickup unit for radiating at least one of light beam on the magneto-optical disc. The cartridge holder holds the disc cartridge. The cartridge holder rotatable is mounted on the base member and moved between a loading position in which the magneto-optical disc is loaded on a disc table mounted on the spindle motor and an unloading position in which the magneto-optical disc is taken out the disc table. The magnetic head generates vertical magnetic field and applies the vertical magnetic field to the magneto-optical disc. The supporting arm supports the magnetic head and is rotatable mounted on the cartridge holder to move corresponding to the movement of the cartridge holder. In the disc recording apparatus, a rotational angle of the supporting arm is larger than a rotational angle of the cartridge holder when the cartridge holder is moved toward the unloading position.

2 Claims, 4 Drawing Sheets

DISC CARTRIDGE LOADING APPARATUS

BACKGROUND

1. Field of the Invention

The present of the invention relates to a disc recording apparatus for an optical disc accommodated in a disc cartridge. More particularly, the present the invention relates to a supporting mechanism of an external magnetic field generating apparatus of a disc recording apparatus.

2. Background of the Invention

There has hitherto been proposed a disc recording apparatus for recording information signals using a recording disc, such as a so-called magnetic disc or a magneto-optical disc accommodated in a disc cartridge. The disc cartridge includes a cartridge main body and a shutter. The cartridge main body is formed of a pair of halves connected to each other. One of the halves has a central opening for a disc rotationally driving apparatus and an aperture for a recording and reproducing apparatus. The other of halve has an aperture for the recording and reproducing apparatus. The recording and reproducing apparatus includes an optical pickup unit and a magnetic head as an external magnetic field generating apparatus generating vertical magnetic field as external magnetic field. The shutter is slidable mounted on the cartridge main body and moves between an opening position of the apertures and a closing position of the apertures. The above mentioned magneto-optical disc as the recording disc includes a disc substrate made of transparent synthetic resin or glass, a recording layer made of a vertical magnetic recording medium and a protective layer or a lubricous layer formed on the recording layer. The recording layer is deposited on one of surfaces of the disc substrate. The information signals are recorded on the magneto-optical disc by radiating a focused light beam and applying vertical magnetic field at a predetermined position of the recording layer. The light beam is radiated from the one surface of the magneto-optical disc through the disc substrate, while the vertical magnetic field is applied from the other surface of the magneto-optical disc. The portion of the recording layer irradiated with the light beam is heated to a temperature higher than the Curie temperature so that its coercivity is lost. The heated portion of the recording layer is magnetized in the direction of the applied vertical magnetic field in the course of being cooled.

As a result, the information signals are recorded on the magneto-optical disc which is accommodated in the disc cartridge as changing the directions of magnetization of the recording layer by modulating the light intensity of light beam in accordance with the recording information signals or by modulating the direction of the vertical magnetic field in accordance with the recording information signals.

A disc recording apparatus for recording information signals using the above-described disc cartridge has a chassis, a cartridge holder, a rotationally driving unit, a magnetic head and an optical pickup unit. The cartridge holder detachably supports the disc cartridge and is provided on the chassis and moves between a loading position where the magneto-optical disc is set on the rotationally driving unit and an unloading position where the magneto-optical disc is detached from the rotationally driving unit. The rotationally driving unit rotationally drives the magneto-optical disc accommodated in the disc cartridge at a constant linear velocity or a constant angular velocity. The magnetic head generates the vertical magnetic field applying the magneto-optical disc. The optical pickup unit focuses and radiates the light beam on the magneto-optical disc. The magnetic head and the optical pickup unit are arranged facing each other with the magneto-optical disc in-between and connected to each other by an arm member. The magnetic head unit and the optical pickup unit are mounted for movement along with the arm member in a radial direction of the magneto-optical disc across its inner and outer peripheries.

The optical pickup unit has a light source, such as a laser diode, and optical elements for guiding and focusing a light beam radiated from the light source. The optical pickup unit is arranged at a distance from the recording layer substantially equal to the focal distance of an objective lens focusing the light beam on the recording layer so that the focusing point of the light beam is positioned on a boundary surface between the recording layer and the disc substrate.

On the other hand, the magnetic head includes a magnetic core and a coil wound on the core for generating the vertical magnetic field. When recording information signals on the recording layer, the magnetic head is supported substantially in sliding contact with the signal recording layer by the interposition of the protective layer or the lubricous layer of synthetic resin of the magneto-optical disc.

As a result, when unloading the magneto-optical disc from the above-described disc recording apparatus, the magnetic head needs to be separated sufficiently from the magneto-optical disc. The reason is that, if the magneto-optical disc is detached while the magnetic head is left in the position of being substantially contacted with the magneto-optical disc, the magnetic head tends to be slidingly contacted with the magneto-optical disc with an excessive pressure to cause damage or destruction of the magnetic head or the magneto-optical disc.

For this reason, the disc recording apparatus is so arranged and constructed that the cartridge main body is held by the cartridge holder and adapted to be contacted with and separated from the chassis of the rotationally driving unit, while the magnetic head is moved in a direction towards and away from the chassis by a distance larger than the cartridge holder. That is, in the present disc recording apparatus, the magnetic head is spaced apart from the cartridge holder when the cartridge holder is spaced apart from the chassis, is moved in a direction toward the unloading position, to permit the disc cartridge to be detached from the cartridge holder. In the above-described disc recording apparatus, when the cartridge holder is caused to approach to the chassis, the disc cartridge held by the cartridge holder is loaded on the chassis, is moved in a direction toward to the loading position, while the magnetic head is moved in a direction of approaching to the cartridge holder to approach to the magneto-optical disc.

The above-described movement of the magnetic head is performed by the cartridge holder movement as a driving source by a link mechanism which is moved in association with the movement of the cartridge holder.

Meanwhile, in the above-described disc recording apparatus, the link mechanism producing movement of the magnetic head is complex in structure and is made up of a large number of components, leading to complex designing, assembling and production.

Besides, since the link mechanism is complex in structure, malfunctions such as operating troubles occur frequently and therefore periodic maintenance and inspection cannot be dispensed with, while repair is rendered difficult. In addition, the disc recording apparatus cannot be reduced in size or weight because of the provision of the above-mentioned link mechanism.

SUMMARY OF THE INVENTION

It is, therefore, an object of the invention to provide a disc recording apparatus which resolves the above mentioned problems.

It is another object of the present invention to provide a loading apparatus for a magneto-optical disc accommodated in a disc cartridge with improved disc cartridge loading operation and disc cartridge unloading operation.

According to the present invention, there is provided a disc recording apparatus including a base member, a holder and a magnetic head. The base member has a disc loading section in which a magneto-optical disc is positioned and loaded. The holder loads the magneto-optical disc on the loading section and is moved between a loading position in which the magneto-optical disc is set on the disc loading section and an unloading position in which the magneto-optical disc is taken out the disc loading section. The magnetic head generates a vertical magnetic field and applies the vertical magnetic field to the magneto-optical disc. The magnetic head is provided on the holder and moved corresponding to the movement of the holder between a first position in which the magnetic head is close to the magneto-optical disc and a second position in which the magnetic head is away from the magneto-optical disc. In the disc recording apparatus, the distance between the magnetic head and the magneto-optical disc is longer than the distance of the holder between the loading position and the unloading position when the holder is moved toward the unloading position.

In the above-described invention, the distance between the magnetic head and the magneto-optical disc is longer than the distance of the holder between the loading position and the unloading position when the holder is moved toward the unloading position. In other words, the magnetic head is moved by the holder the distance different from the distance of the movement of the holder. As a result, the relative position between the holder and the magnetic head may be changed by moving the holder.

BRIEF DESCRIPTION OF THE DRAWING

The invention will be more readily understood with reference to the accompanying drawing, wherein.

DESCRIPTION OF THE INVENTION

Figure 1:
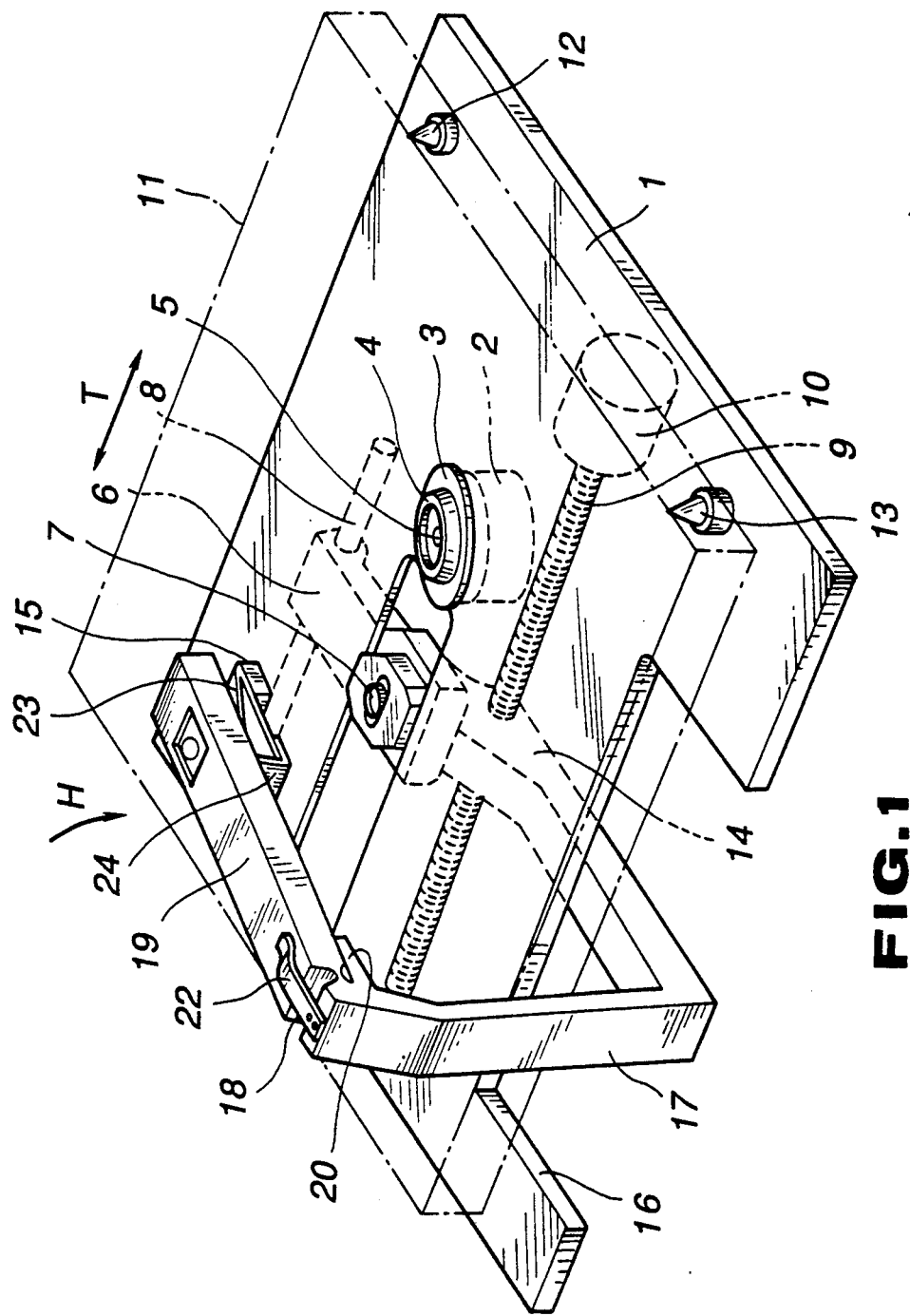
FIG. 1 shows a perspective view of a disc recording apparatus according to the present invention.

Referring to the drawings, a preferred embodiment of the present invention will be explained in detail.

In the present embodiment, the disc recording apparatus according to the present invention is arranged as an apparatus for recording and reproducing information signals using a disc cartridge accommodating a magneto-optical disc as a recording disc.

Figure 4:
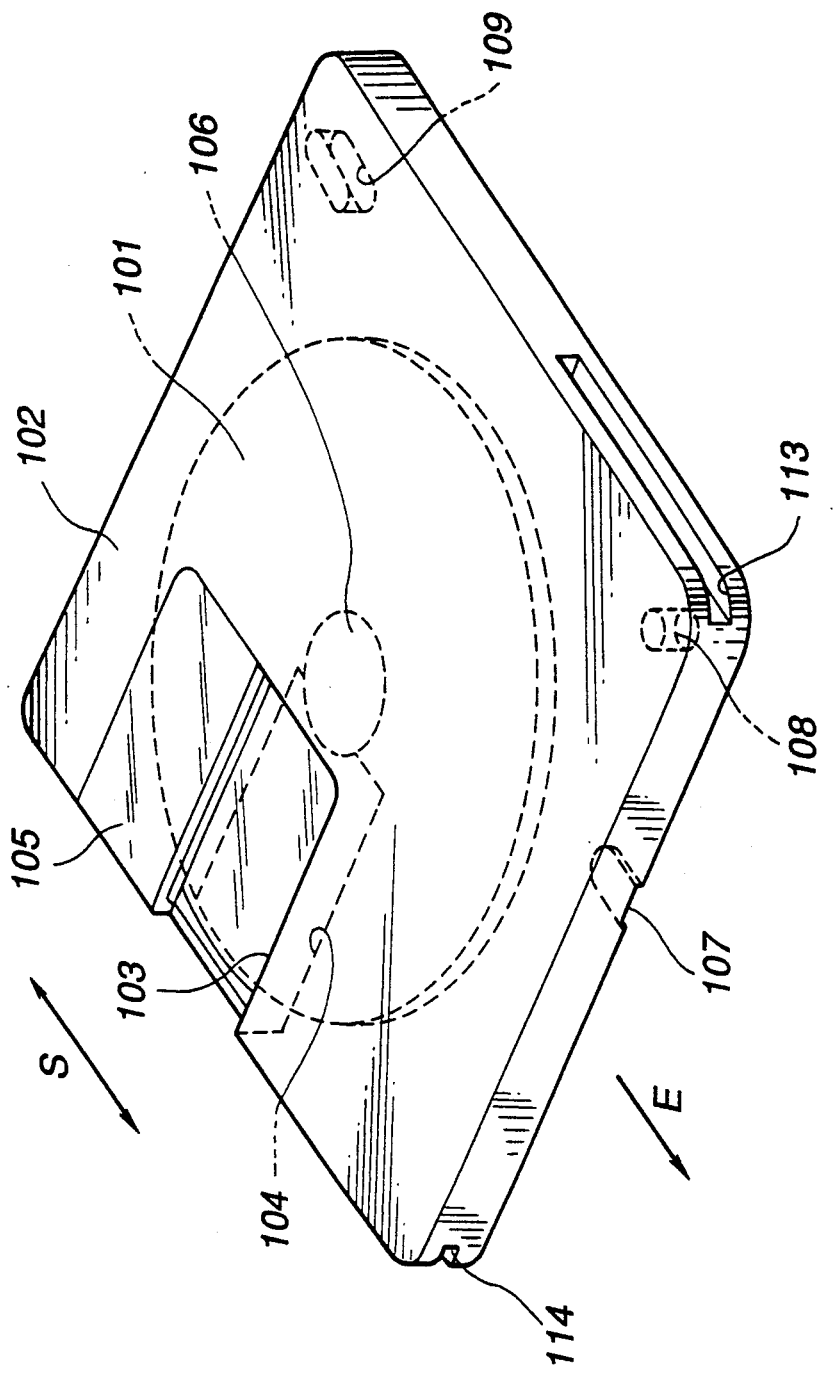
FIG. 4 shows a perspective view of the disc cartridge loaded on the disc cartridge apparatus.

A cartridge main body 102 of the disc cartridge accommodates a magneto-optical disc 101. The magneto-optical disc 101 as recording disc includes a disk-shaped substrate, recording layer and a protective layer. The disc substrate is made of a transparent synthetic resin or glass. The recording layer is made of a vertical magnetic recording layer and is deposited on one of the surface of the disc substrate, as shown in FIG. 4. The protective layer is formed on the recording layer to protect the recording layer and is made of synthetic resin or lubricous material. The disc substrate has a central opening at its central portion. A chucking device 106 is provided at the central portion of the disc substrate and has a metal plate closing the central opening of the disc substrate. A chucking part 106 is provided at a central portion of the magneto-optical disc 101 and includes an opening of the disc substrate and a metal plate. The opening is formed at the central portion of the disc substrate and by the metal plate. The opening of the chucking part 106 has its center coincident with the center of curvature of a spirally extending substantially concentric recording track formed on the magneto-optical disc 101.

The cartridge main body 102 is in the form of a casing sized to house the recording disc 101 therein. The upper major surface of the cartridge main body 102 is formed with an aperture 103 for the magnetic head as explained later whereby one of the surfaces of the magneto-optical disc 101 is exposed to outside across its inner and outer peripheries. The lower major surface of the cartridge main body 102 is formed with an aperture 104 for the optical pickup unit as explained later whereby the other major surface of the recording disc 101 is exposed to outside across its inner and outer peripheries. These apertures 103, 104 are formed of substantially the same size and shape and provided facing each other. These apertures 103, 104 are each in the form of a rectangle extending from the mid part of the major surfaces of the cartridge main body 102 to the vicinity of a lateral side thereof with respect to the loading direction of the disc cartridge, as shown by an arrow E in FIG. 4, into the disc recording apparatus. A chucking, not shown for exposing the chucking part 106 to outside is provided at the center of the lower major surface of the cartridge main body 102.

A shutter 105 for opening and closing the apertures 103, 104 is slidable mounted on the cartridge main body 102. The shutter 105 is a thin rectangular plate of synthetic resin or metal bent in the shape of a letter U, the arms of which are adapted for closing the apertures 103, 104. The shutter 105 is supported by a lateral side of the cartridge main body 102 with a web part of the letter U being slid in contact with the lateral side of the cartridge main body 102, as shown by an arrow S in FIG. 4. The apertures 103, 104 are opened or closed by the shutter 105 being slid with respect to the cartridge main body 102.

The lower major surface of the cartridge main body 102 has a pair of positioning holes 108, 109 arrayed in the fore-and-aft direction. In these positioning holes 108, 109 are introduced positioning pins of a disc loading section of the disc recording apparatus for positioning the cartridge main body 102 with respect to the disc loading section.

A shutter opening groove 114 beginning at a front side and terminating at a mid part of the shutter 105 is formed on the lateral side of the cartridge main body 102 carrying the shutter 105. A shutter opening pin, not shown, is introduced into the shutter opening groove 114 from the front side of the cartridge main body 102 for sliding the shutter 105 towards the rear side of the cartridge main body 102 or opening the apertures 103, 104. A mistaken insertion inhibiting groove 113 is formed on the lateral side of the cartridge main body 102 opposite to the lateral side fitted with the shutter 105. When the disc cartridge is inserted in a mistaken direction into the disc recording apparatus, the shutter opening pin is inserted in the mistaken insertion inhibiting groove 113. As a result, the disc cartridge cannot insert into the disc recording apparatus.

A recording indicating part 107 is provided at the front side of the lower major surface of the cartridge main body 102. The recording indicating part 107 is a shallow recess formed on the lower major surface of the cartridge main body 102.

The disc recording apparatus has a chassis 1, as shown in FIG. 1. The disc loading section is provided on the upper surface of the chassis 1. A spindle motor 2 is mounted at a mid part of the lower surface of the chassis 1 and has its rotating shaft 5 protruded towards the upper surface side of the chassis 1 via a through-hole in the chassis 1. A disc table 3 of the disc loading section is mounted on the distal end of the rotating shaft 5. The disc table 3 is substantially disk-shaped and supported by the rotating shaft 5 introduced into its central supporting hole, not shown. A substantially conical centering member 4 is provided on the upper surface of the disc table 3. The centering member 4 has an outer diameter such that the centering member 4 may be introduced into through-hole of the chucking part 106 of the recording disc 101. When the rim portion of the through-hole of the magneto-optical disc 101 is set on the disc table 3, has its outer peripheral surface in abutting contact with the inner rim of the through-hole for centering the magneto-optical disc 101.

A magnet, not shown, for magnetically attracting the metal plate of the chucking part 106 of the recording disc 101 is mounted on the disc table 3. The magneto-optical disc 101 is positioned and held on the disc table 3 by this magnet.

On the chassis 1, a pair of positioning pins 12, 13 for positioning the cartridge main body 102 are arrayed in the fore-and-aft direction. These positioning pins 12, 13 are formed conical and tapered at the distal ends. These positioning pins 12, 13 are introduced into the positioning holes 109, 108 of the disc cartridge loaded on the chassis 1 for positioning the cartridge main body 102 with respect to the chassis 1.

The optical pickup unit 6 is mounted on the chassis 1 for movement towards and away from spindle motor 2 as indicated by arrow T in FIG. 1. The optical pickup unit 6 includes an optical block on which an objective lens driving device is mounted and within which a light source, such as a laser diode, optical elements for guiding a light beam radiated from the light source, a photodetector for receiving the light beam reflected from the magneto-optical disc 101 etc. are enclosed. With the optical pickup unit 6, the light beam radiated from the light source is emitted from the optical block so as to be incident on an objective lens 7 supported by the objective lens driving device which causes the objective lens 7 to be moved in two directions, that is in a direction along the optical axis of the objective lens as a focusing direction and in a direction perpendicular to the optical axis as a tracking direction. The optical pickup unit 6 is adapted to be moved in a direction along the axes of a guide shaft 8 and a screw shaft 9, mounted parallel to each other on the lower surface of the chassis, by being supported by the guide shaft 8 and the screw shaft 9. The guide shaft 8 is passed through a bearing hole formed in the optical optical block, while the screw shaft 9 is threaded in a tapped bearing hole formed in the optical block. The screw shaft 9 is rotated about its one axis by an optical pickup feed motor 10 provided on the lower surface of the chassis 1. When the screw shaft 9 is rotated by the motor 10, the optical pickup unit 6 is moved in a direction along the axes of the guide shaft 8 and the screw shaft 9, as indicated by the arrow T in FIG. 1.

The optical pickup unit 6 has its objective lens driving device facing the upper side of the chassis 1 via a slit-shaped opening formed in the chassis 1. The objective lens 7 of the optical pickup unit has its optical axis perpendicular to the chassis 1.

A magnetic head 15 is mounted on the optical pickup unit 6 by means of a magnetic head supporting member and a magnetic head supporting arm 19. The magnetic head supporting member includes a connecting arm 14 having its proximal end attached to the optical block of the optical pickup unit 6 and extended substantially parallel to the chassis 1, and an upstanding supporting pillar 17 integrated to the foremost part of the connecting arm 14. The magnetic head supporting arm 19 has its proximal end rotatable supported by a hinge 18 with respect to the upper end of the supporting pillar 17. The supporting pillar 17 has its foremost part projected above the chassis 1 by way of a clearance 16 formed at a rear side of the chassis 1. The hinge 18 is formed of a synthetic resin plate of a reduced thickness. The magnetic head supporting arm 19 may be rotated about the hinge 18 as a center of rotation by the flexure of the hinge 18. The magnetic head supporting arm 19 is extended towards the optical pickup unit 6 substantially parallel to the chassis 1 and may be rotated about the hinge 18 so that the distal part of the arm 19 may be moved towards and away from the chassis 1. The upper end of the supporting pillar 17 is provided with a limiting piece 20 facing the proximal end of the magnetic head supporting arm 19. When the magnetic head supporting arm 19 is substantially parallel to the chassis 1, the limiting piece 20 is caused to bear against the supporting arm 19 for limiting rotation of the magnetic head supporting arm 19 towards the chassis 1.

The magnetic head 15 is attached to the front side of the magnetic head supporting arm 19 facing the chassis 1 by means of a gimbal spring 23. The magnetic head 15 is held at a position of facing the objective lens 7. The magnetic head 15 is located on the optical axis of the objective lens 7 and may be moved in a direction towards and away from the objective lens 7. The gimbal spring 23 is a bent plate spring of a reduced thickness having the proximal end supported by the magnetic head supporting arm 19 and having the distal end fitted with the magnetic head 15. By this gimbal spring 23, the magnetic head 15 may be resiliently moved in a direction towards and away from the magnetic head supporting arm 19. The gimbal spring 23 is limited in its movement of displacing the magnetic head 15 away from the magnetic head supporting arm 19 by a limiting piece 24 attached to the distal end of the magnetic head supporting arm 19. The limiting piece 24 has its proximal end supported by the magnetic head supporting arm 19 and has its distal end supported by the magnetic head supporting arm 19 so that its bent foremost part facing the side of the gimbal spring 23 facing the chassis 1.

When the disc cartridge is loaded on the disc recording apparatus for recording information signals on the magneto-optical disc 101, the magnetic head supporting arm 19 is rotated for bringing the magnetic head 15 to a first position approaching the chassis 1. On the other hand, when the disc cartridge is to be unloaded, the magnetic head supporting arm 19 is rotated for bringing the magnetic head 15 to a second position away from the chassis 1. When the magnetic head 15 is in the first position, the magnetic head supporting arm 19 is substantially parallel to the chassis 1.

A plate-like spring 22 is mounted for bridging the foremost part of the supporting pillar 17 and the proximal end of the magnetic head supporting arm 19. The plate-like spring 22 thrusts the proximal end of the magnetic head supporting arm 19 for rotationally biasing the magnetic head supporting arm 19 in a direction in which the magnetic head 15 approaches to the objective lens 7, as shown by an arrow H in FIG. 1.

A cartridge holder 11, into which the disc cartridge is introduced from its front side, is arranged on the chassis 1. The cartridge holder 11 is in the form of a casing opened at the front side and partially opened at the upper and lower sides. When the disc cartridge is introduced into the cartridge holder 11 from the front side, the cartridge holder 11 holds the cartridge main body 102 of the disc cartridge. The cartridge holder 11 is of a size substantially equal to the cartridge main body 102. The disc cartridge is introduced into the cartridge holder 11 in a direction in which the front side of the disc cartridge faces the front side of the cartridge holder 11. When the disc cartridge is introduced into the cartridge holder 11, the shutter 105 is moved with respect to the cartridge main body 102 by the shutter opening pin of the disc recording apparatus, not shown, for opening the apertures 103, 104. When the disc cartridge is held by the cartridge holder 11, the apertures 103, 104 are exposed to outside of the cartridge holder 11 via opening parts formed in the upper lower sides of the cartridge holder 11.

Figure 2:
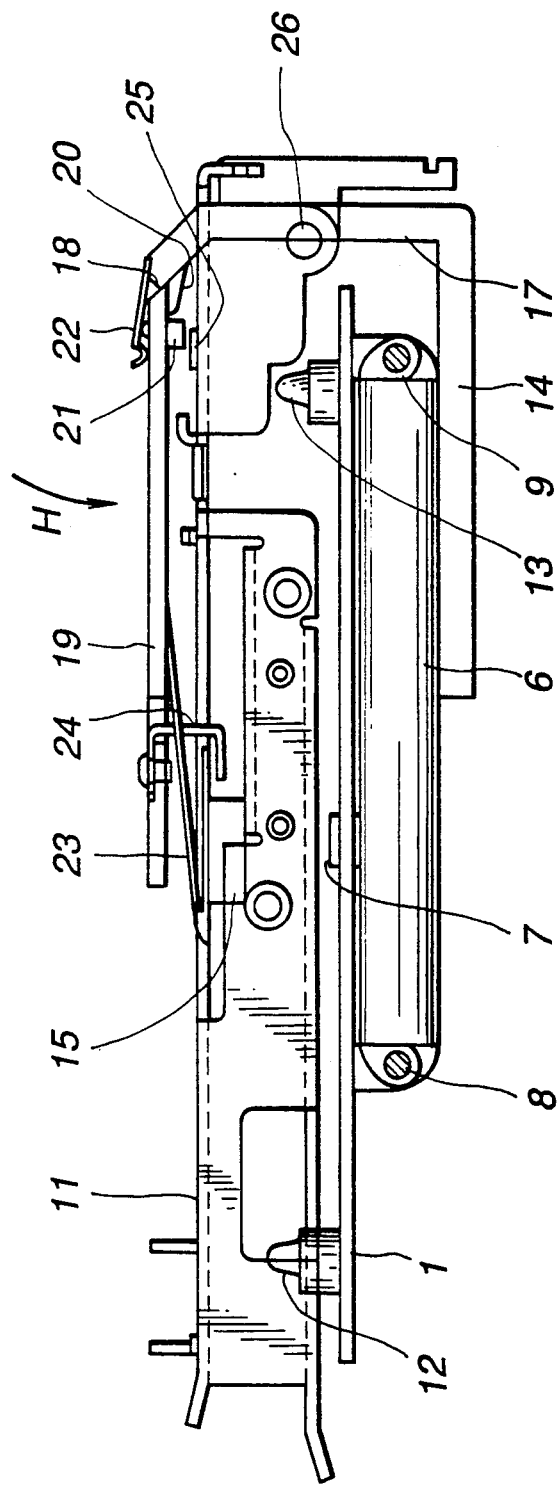
FIG. 2 shows a side view of the disc recording apparatus shown in FIG. 1 in which a disc cartridge is loading position.
Figure 3:
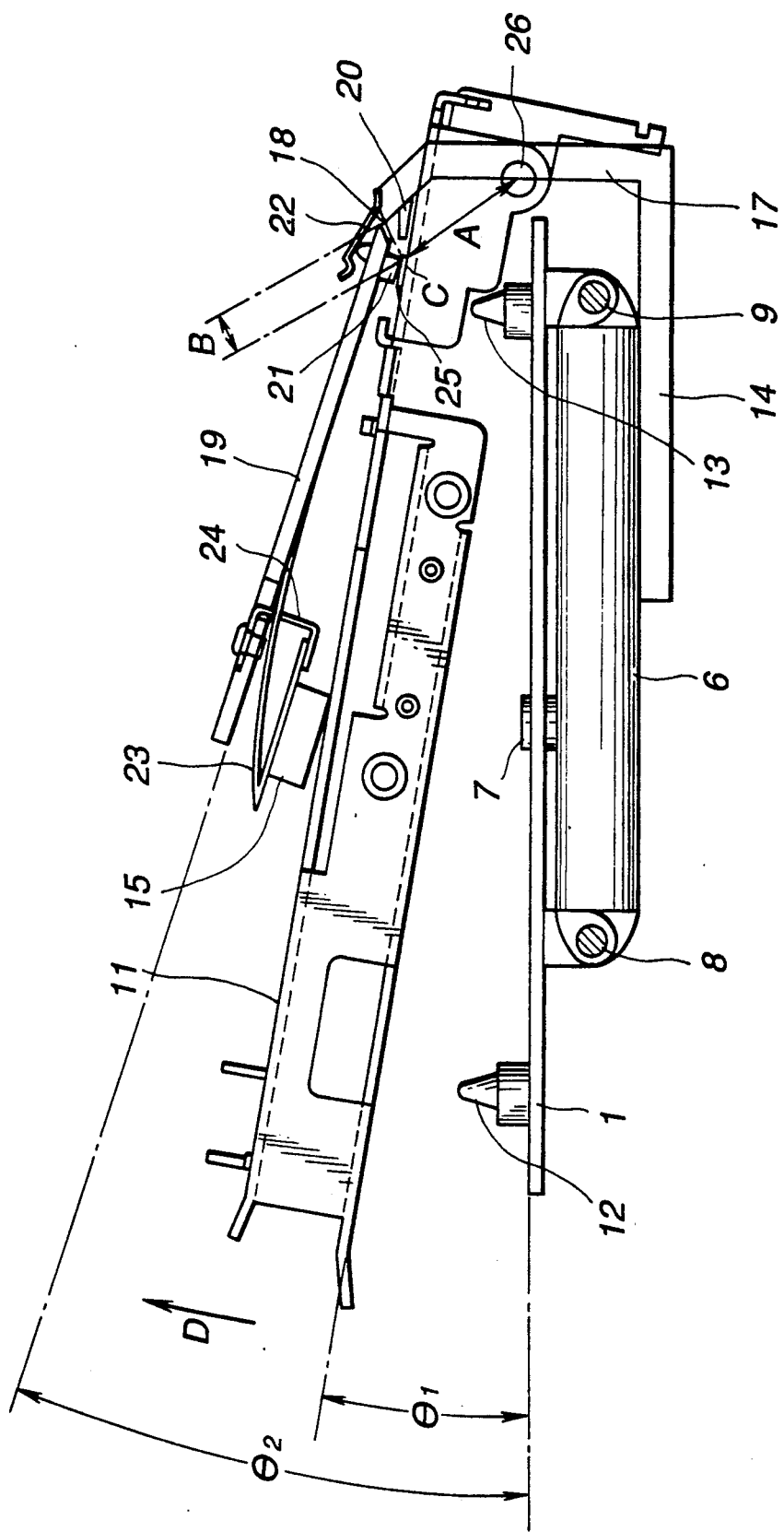
FIG. 3 shows a side view of the disc recording apparatus shown in FIG. 1 in which the operation of attachment and detachment of the disc cartridge is enable.

The cartridge holder 11 is rotatable supported by the chassis 1, by means of a rear supporting shaft 26, for rotation about the supporting shaft 26, so that the cartridge holder 1 may be moved towards and away from the chassis 1, as shown in FIGS. 2 and 3. When the cartridge holder 11 is moved in a direction towards the chassis 1, the cartridge holder 11 is parallel to the chassis 1. When the cartridge holder 11 is at a position parallel to the chassis 1, the disc cartridge held by the cartridge holder 11 is loaded on the disc loading section on the chassis 1.

An abutment projection 25 is provided at a position on the upper surface of the cartridge holder 11 facing the proximal end of the magnetic head supporting arm 19. A mating abutment projection 21 is provided at a position of the magnetic head supporting arm 19 facing the abutment projection 25.

For loading the disc cartridge in the above-described disc recording apparatus, the cartridge holder 11 rotated upwardly away from the chassis 1, as shown by an arrow D in FIG. 3, for bringing the magnetic head 15 to the above-mentioned second position. When the cartridge holder 11 is moved upwardly, the abutment projection 25 is abutted on the mating abutment projection 21 so that the magnetic head supporting arm 19 is raised to follow the rotation of the cartridge holder 11 for bringing the magnetic head to the second position.

When the abutment projection 25 is caused to bear on the mating abutment projection 21 at a point C, the point C is at such a position in which a distance B from the point C to the hinge 18 shown by an arrow B in FIG. 3 is shorter than a distance A from the point C to the axis of the central shaft 26 similarly shown by an arrow A in FIG. 3. As a result, when the cartridge holder 11 is rotated upwardly from the position parallel to chassis 1 by a predetermined angle $\theta_1$ in FIG. 3 in a direction away from the chassis 1, the magnetic head supporting arm 19 is rotated upwardly by an angle $\theta_2$ larger than the angle $\theta_1$ in a direction away from the chassis 1.

That is, when the magnetic head 15 is moved in the above-mentioned second position, the magnetic head 15 is moved away from the cartridge holder 11 so as to lie above the cartridge holder 11. As a result, when the magnetic head 15 is at the above-mentioned second position, smooth insertion of the disc cartridge into the cartridge holder is not impeded by the magnetic head 15.

When the disc cartridge is introduced from the front side into the cartridge holder 11, the aperture 103 for the magnetic head 15 and the aperture 104 for the optical pickup unit 6 are both opened.

When the cartridge holder 11 is rotated towards chassis 1, as shown in FIG. 2, the disc cartridge is set and loaded on the chassis 1. The cartridge main body 102 is positioned with respect to the chassis 1 by the positioning pins 12, 13 introduced into the positioning holes 109, 108. The magneto-optical disc 101 is set and loaded on the disc table 3 while being centered by the centering member 4. At this time, the magneto-optical disc 101 is enabled to be rotated by the spindle motor 2 along with the disc table 3.

In this state, the optical pickup unit 6 has its objective lens 7 facing the major surface of the magneto-optical disc 101 via the aperture 104. The optical pickup unit 6 may be moved across the inner and outer peripheries of the magneto-optical disc 101 with the objective lens 7 continuously facing the magneto-optical disc 101. The optical pickup unit 6 is enabled to radiate the light beam to the recording layer via the above-mentioned major surface of the magneto-optical disc 101.

The magnetic head 15 is rotated to follow the cartridge holder 11 in a direction of approaching to the chassis 1 under the force of the plate-like spring 22 of the magnetic head supporting arm 19, as shown by the arrow H in FIG. 2. The magnetic head supporting arm 19 is halted, by abutment of the limiting piece 20 on its proximal end, at a position in which the supporting arm 19 is substantially parallel to the chassis 1. The magnetic head 15 is inserted into the inside of the cartridge main body 102 via the opening formed on the upper surface of the cartridge holder 11 and the aperture 103 of the disc cartridge so as to be brought to the above-mentioned first position of abutting against the major surface of the magneto-optical disc 101. It is noted that the magnetic head 15 is caused to approach to the magnetic head supporting arm 19 while the gimbal spring 23 is flexed slightly. That is, the magnetic head 15 is pressed against the magneto-optical disc 101 at a predetermined pressing force by the resilient restoring force of the gimbal spring 24.

The spindle motor 2, the optical pickup unit 6 and the magnetic head 15 are actuated in this state for enabling information signals to be recorded on the magneto-optical disc 101. The magneto-optical disc 101 is rotationally driven and the light beam from the optical pickup unit 6 is converged and radiated by the optical pickup unit 6 for heating the recording layer, while the vertical magnetic field is applied by the magnetic head 15 on the heated portion of the recording layer for recording information signals.

Meanwhile, when the power source of the disc recording apparatus is turned on, or when control instructions are issued for starting the recording mode or the playback mode, the optical pickup unit 6 is moved to a position facing the radially innermost portion of the signal recording area of the magneto-optical disc 101 for reading the table-of-contents (TOC) data recorded on the magneto-optical disc 101. The TOC data are recorded in the radially innermost portion of the signal recording region of the magneto-optical disc 101.

For taking out the loaded disc cartridge from the disc recording apparatus, the cartridge holder 11 is rotated upwardly by the predetermined angle $\theta_1$ away from chassis 1, as shown by the arrow D in FIG. 3. At this time, the magnetic head supporting arm 19 is uplifted by the cartridge holder 11, as explained hereinabove and rotated by the predetermined angle $\theta_2$, for bringing the magnetic head 15 to the above-mentioned second position. The magnetic head 15 is moved at this time away from the disc cartridge without impending smooth ejection of the disc cartridge out of the cartridge holder 11.

What is claimed is:

1. A disc cartridge loading apparatus comprising:
   base means having disc rotationally driving means for rotationally driving a magneto-optical disc accommodated in a disc cartridge and an optical pickup unit for radiating at least one light beam on the magneto-optical disc;
   a cartridge holder for holding the disc cartridge, rotatably mounted on the base means at a point of rotation and moved between a loading position in which the magneto-optical disc accommodated in the disc cartridge is loaded on the disc rotationally driving means and an unloading position in which the magneto-optical disc accommodated in the disc cartridge is taken out of the disc rotationally driving means, the unloading position being at a higher position than the loading position;
   positioning means provided on the base means for positioning the disc cartridge held by the cartridge holder when the cartridge holder is positioned at the loading position, the positioning means including a pair of pins which are engaged to holes formed on the disc cartridge holder when the cartridge holder is positioned at the loading position;
   external magnetic field generating means for generating and applying an external magnetic field to the magneto-optical disc;
   supporting means for supporting the external magnetic field generating means and rotatable mounted on the cartridge holder, the supporting means being connected at a connected end to the optical pickup unit and being moved with the optical pickup unit in a radial direction of the magneto-optical disc, the direction being parallel to the insertion direction of the disc cartridge into the cartridge holder;
   abutment means provided between the cartridge holder and the supporting means so that the cartridge holder and the supporting means abut at an abutment location, and a first distance from the abutment location to the connected end of the supporting means is less than a second distance from the abutment location to the point of rotation of the cartridge holder, for rotating the supporting means when the cartridge holder is moved toward the unloading position, whereby a first rotational angle between the base means and the supporting means increases by a larger amount than a second rotational angle between the base means and the cartridge holder; and
   stopper means near the connected end of the supporting means for stopping the rotation of the supporting means when the cartridge holder is positioned at the loading position and for holding the supporting means approximately parallel to the base means.

2. A disc cartridge loading apparatus according to claim 1, wherein the abutment means comprises a projection formed on one of the supporting means and the cartridge holder and a receiving portion formed on the other of the supporting means and the cartridge holder.

* * * * *